United States Patent
Park et al.

(10) Patent No.: US 11,586,745 B2
(45) Date of Patent: Feb. 21, 2023

(54) INTEGRATED ONE-CHIP SECURITY MODULE FOR SMART ENERGY SECURITY THREAT RESPONSE

(71) Applicant: CIOT Inc., Seoul (KR)

(72) Inventors: Hyeon-Ju Park, Yongin-si (KR); Han-Na Park, Seoul (KR)

(73) Assignee: CIOT Inc., Seoul (KR)

( * ) Notice: Subject to any disclaimer, the term of this patent is extended or adjusted under 35 U.S.C. 154(b) by 33 days.

(21) Appl. No.: 17/106,081

(22) Filed: Nov. 28, 2020

(65) Prior Publication Data

US 2022/0171865 A1    Jun. 2, 2022

(30) Foreign Application Priority Data

Nov. 27, 2020 (KR) .......................... 10-2020-0162534

(51) Int. Cl.
*G06F 21/00* (2013.01)
*G06F 21/60* (2013.01)
*H04L 9/06* (2006.01)

(52) U.S. Cl.
CPC .......... *G06F 21/602* (2013.01); *G06F 21/606* (2013.01); *H04L 9/0643* (2013.01)

(58) Field of Classification Search
None
See application file for complete search history.

(56) References Cited

U.S. PATENT DOCUMENTS

| | | | |
|---|---|---|---|
| 2014/0375474 A1* | 12/2014 | Dietrich | G06F 21/57 340/870.02 |
| 2021/0117374 A1* | 4/2021 | Pinilla Pico | G06F 9/30134 |
| 2022/0171865 A1* | 6/2022 | Park | G06F 21/602 |

* cited by examiner

*Primary Examiner* — Jeffery L Williams
(74) *Attorney, Agent, or Firm* — Studebaker & Brackett PC

(57) ABSTRACT

An integrated one-chip security module for a smart energy security threat response included in an intelligent smart meter constituting a smart energy system includes: a first core unit collecting measured data generated in an operation process of the smart energy system and stores the measured data in a security memory; and a second core unit encrypting the measured data stored in the security memory and transmitting the encrypted data to an external device.

4 Claims, 3 Drawing Sheets

[FIG. 1]
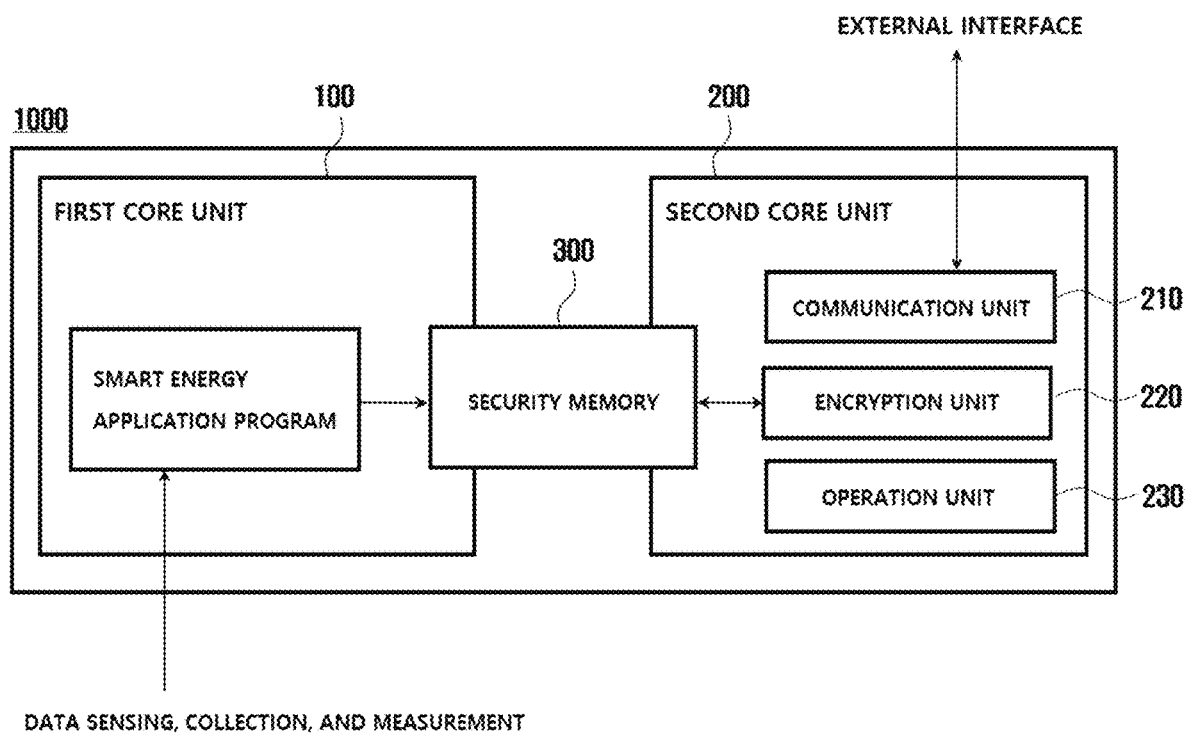
[FIG. 2]
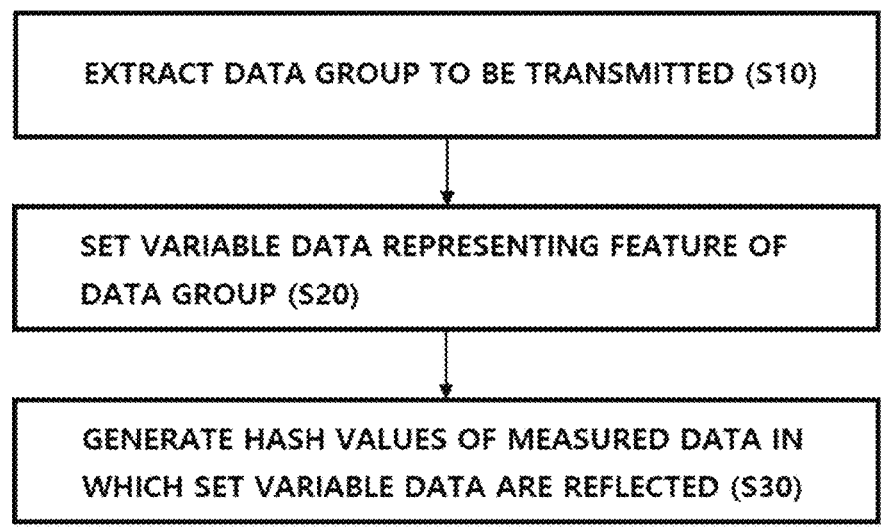

[FIG. 3]
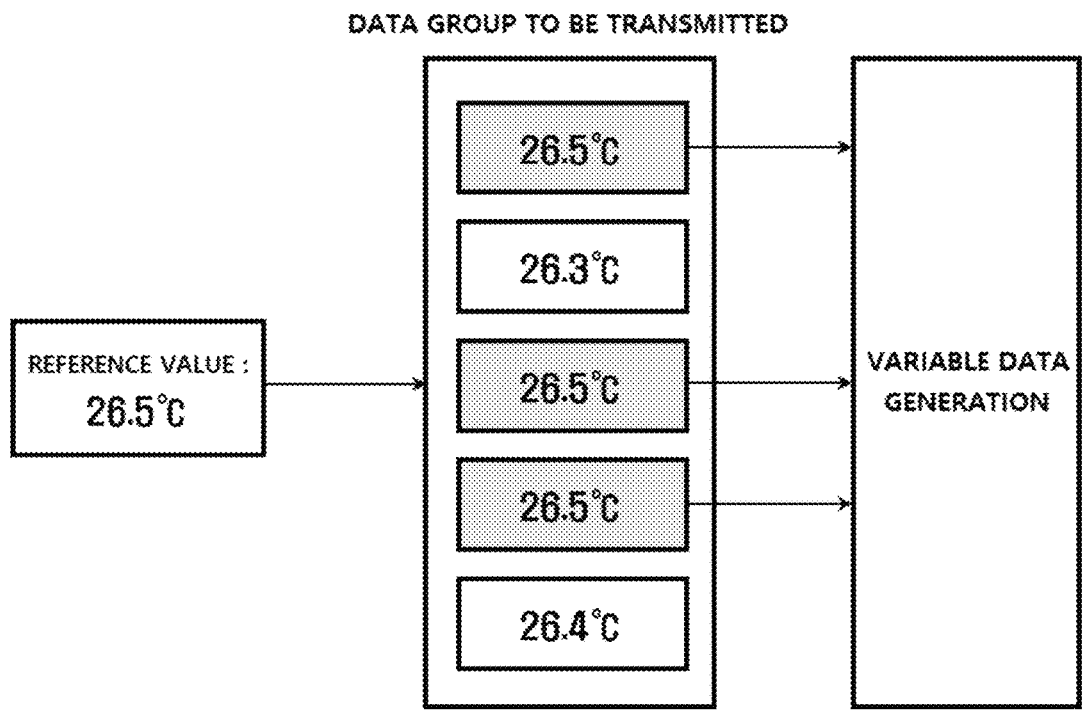
[FIG. 4]
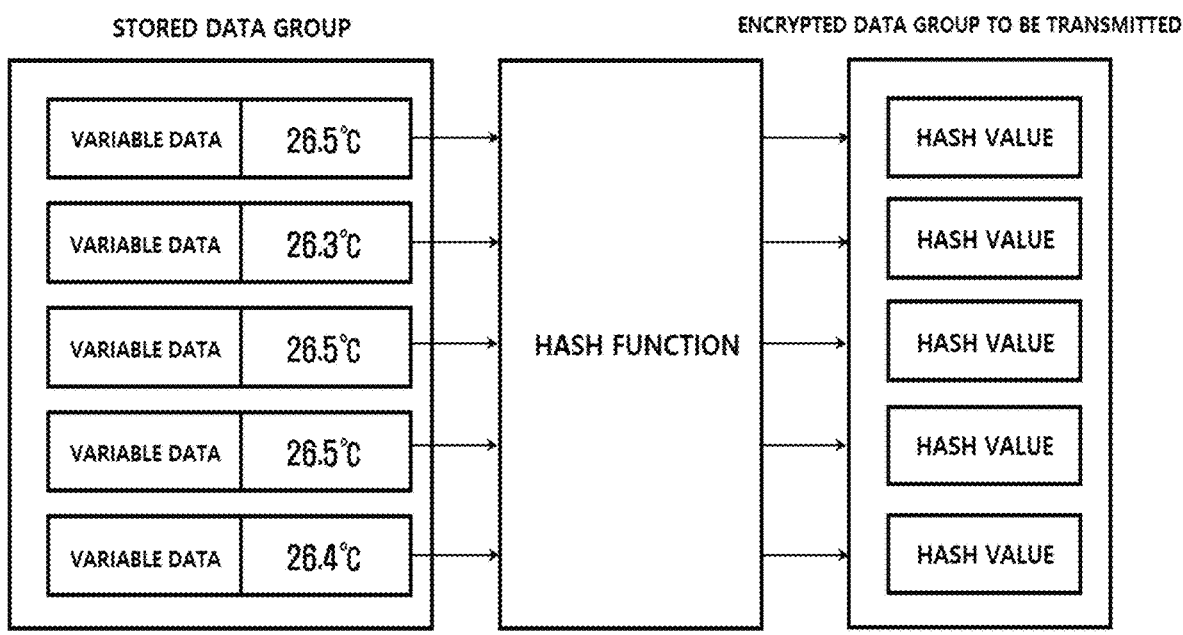

[FIG. 5]

ENCRYPTED DATA GROUP TO BE TRANSMITTED

| HASH VALUE FOR VARIABLE DATA | ENCRYPTED FIRST MEASURED DATA |
|---|---|
| HASH VALUE FOR VARIABLE DATA | ENCRYPTED SECOND MEASURED DATA |
| HASH VALUE FOR VARIABLE DATA | ENCRYPTED THIRD MEASURED DATA |
| HASH VALUE FOR VARIABLE DATA | ENCRYPTED FOURTH MEASURED DATA |
| HASH VALUE FOR VARIABLE DATA | ENCRYPTED FIFTH MEASURED DATA |

INTEGRATED ONE-CHIP SECURITY MODULE FOR SMART ENERGY SECURITY THREAT RESPONSE

BACKGROUND

1. Field

The present invention relates to an integrated one-chip security module for a smart energy security threat response, and more particularly, to an integrated one-chip security module for a smart energy security threat response capable of constructing a hardware open platform environment-based security platform that may provide measurement and security of handling data in smart energy in a one-chip form in order to respond to a security threat of a smart energy environment.

2. Description of Related Art

In recent, in accordance with the needs of the times for energy saving, a study on a technology for reducing standby power of household appliances has been actively conducted. In terms of such a study, an interest in energy management and a cloud-based home platform has increased.

In addition, many companies have made various efforts to apply the Internet of things (IoT) to each device in a home platform. Some devices require detailed control, but control levels of power or electric devices are often implemented by the IoT.

In the field of hardware materials, components, and equipments that constitute a smart energy system, conventionally, several components performing a single function have constituted a module in a multi-chip form, but recently, several sensors such as an application sensor and a communication sensor have been rapidly changed into a system on chip (SoC) form.

In particular, intelligent smart meters such as a water meter, a watt meter, a thermo-hygrometer, and a pressure gauge that measure data (temperature, power, pressure, and the like) required in a process of operating the smart energy system have been recently integrated in one chip set in an IoT embedded environment in which various chip ICs serving as communication, operation, and function sensors are developed and operated in a multi-chip form, unlike the past, and data collected and transmitted through such an integrated chip set have also been transmitted to a cloud. Therefore, a security technology has also been demanded in the integrated chip set.

Meanwhile, the related art described above is technical information that the present inventors have possessed in order to derive the present invention or have acquired in a process of deriving the present invention, and is not necessarily a known technology disclosed to the general public before filing the present invention.

RELATED ART DOCUMENT

Patent Document (Patent Document 1) Korean Patent No. 10-1793991
(Patent Document 2) Korean Patent No. 10-1144150

SUMMARY

An aspect of the present invention provides an integrated one-chip security module for a smart energy security threat response capable of providing measurement and security of data required to operate a smart energy system in a one-chip (multi core) form.

Another aspect of the present invention provides an integrated one-chip security module for a smart energy security threat response capable of improving security and reliability of data by encrypting data according to data characteristics in an encryption process of measured data.

Technical objects of the present invention are not limited to the objects described above. That is, other objects that are not mentioned may be obviously understood by those skilled in the art from the following description.

According to an aspect of the present invention, an integrated one-chip security module for a smart energy security threat response is included in an intelligent smart meter constituting a smart energy system, and includes: a first core unit collecting measured data generated in an operation process of the smart energy system and stores the measured data in a security memory; and a second core unit encrypting the measured data stored in the security memory and transmitting the encrypted data to an external device.

The second core unit may include: a communication unit communicating with an external interface to transmit and receive data; an encryption unit accessing the security memory to encrypt the measured data stored in the security memory and transferring the encrypted specific data to the communication unit; and an operation unit controlling a data processing process generated through the second core unit, the encryption unit withholding a transmission process of the measured data until the measured data collected in the security memory are accumulated and stored by a predetermined number, setting variable data representing a feature of an accumulated and stored data group when it is confirmed that the measured data have been accumulated and stored by the predetermined number, and encrypting the measured data on the basis of the set variable data.

The setting of the variable data representing the feature of the accumulated and stored data group may detect measured data corresponding to a reference value received from a manager terminal possessed by a manager managing the smart energy system among a plurality of accumulated and stored measured data when it is confirmed that the measured data have been accumulated and stored by the predetermined number, and may generate variable data on the basis of storage points in time of the detected measured data and the number of detected measured data, convert modified data in which the generated variable data and the respective measured data are combined with each other into hash values using a hash function, and transfer the converted hash values to the communication unit.

The setting of the variable data representing the feature of the accumulated and stored data group may calculate the number of measured data representing the same measured value among a plurality of accumulated and stored measured data and set measured data representing the same measured value most as the variable data, when it is confirmed that the measured data have been accumulated and stored by the predetermined number, and may calculate an average value of the plurality of accumulated and stored measured data and set the calculated average value as the variable data, convert modified data in which the set variable data and the respective measured data are combined with each other into hash values using a hash function, and transfer the converted hash values to the communication unit, when it is confirmed that all of the plurality of accumulated and stored measured data represent different measured values.

The setting of the variable data representing the feature of the accumulated and stored data group may calculate the number of measured data representing the same measured value among a plurality of accumulated and stored measured data and set measured data representing the same measured value most as the variable data, when it is confirmed that the measured data have been accumulated and stored by the predetermined number, and may calculate an average value of the plurality of accumulated and stored measured data and set the calculated average value as the variable data, convert the variable data into hash values using a hash function, encrypt the measured data, and then transmit the encrypted measured data with the converted hash values as headers to the communication unit, when it is confirmed that all of the plurality of accumulated and stored measured data represent different measured values.

BRIEF DESCRIPTION OF DRAWINGS

FIG. 1 is a conceptual diagram illustrating a schematic configuration of an integrated one-chip security module for a smart energy security threat response according to an embodiment of the present invention.

FIGS. 2 to 5 are diagrams for describing various data encryption processes performed in the integrated one-chip security module for a smart energy security threat response of FIG. 1.

DETAILED DESCRIPTION

Exemplary embodiments of the present invention will be described in detail with reference to the accompanying drawings. These embodiments will be described in detail for those skilled in the art to practice the present invention. It should be appreciated that various embodiments of the present invention are different from each other, but do not have to be exclusive. For example, specific shapes, structures, and characteristics described herein may be implemented in another embodiment without departing from the spirit and the scope of the present invention in connection with an embodiment. In addition, it should be understood that positions or an arrangement of individual components in each disclosed embodiment may be changed without departing from the spirit and the scope of the present invention. Therefore, a detailed description to be described later should not be construed as being restrictive, and the scope of the present invention is defined only by the accompanying claims and their equivalents if appropriate. Similar reference numerals will denote the same or similar functions throughout the accompanying drawings.

Hereinafter, exemplary embodiments of the present invention will be described in more detail with reference to the drawings.

FIG. 1 is a diagram illustrating a schematic configuration of an integrated one-chip security module for a smart energy security threat response according to an embodiment of the present invention.

The integrated one-chip security module for a smart energy security threat response according to the present invention is a one-chip (multi-core)-type hardware platform provided in an intelligent smart meter constituting a smart energy system.

Here, the intelligent smart meter may include a water meter, a watt meter, a thermometer, and the like, and may further include various measuring devices for measuring data required to operate the smart energy system although not described. However, hereinafter, for convenience of explanation, only a case where the intelligent smart meter is a watt meter measuring consumed power will be described.

For example, the integrated one-chip security module for a smart energy security threat response according to the present invention is installed in a watt meter provided at each home, collects a power use amount from the watt meter, encrypts data related to the collected power use amount, and transmits the encrypted data to a central server.

In particular, the integrated one-chip security module for a smart energy security threat response according to the present invention is characterized in that a core measuring an electricity use amount and a core performing data security are included in one chip by separately operating an application program and a process.

Specifically, an application program core is operated so as to be able to perform only writing of collected, sensed, measured data and the like in a security memory space designated in advance, and only an encryption unit of a processor core may access the designated security memory space, encrypt data stored in a memory by an application program unit. Thereafter, a processor core region may transfer the encrypted data to an external device or an external interface, thereby improving security of the transferred data.

Specifically, the integrated one-chip security module 1000 for a smart energy security threat response according to an embodiment of the present invention includes a first core unit 100, a second core unit 200, and a security memory 300.

The first core unit 100 is installed with an application program for constructing the smart energy system, collects measured data generated in an operation process of the smart energy system through the application program, and stores the measured data in the security memory 300.

That is, the first core unit 100 performs only a data collection function, periodically senses, collects, and measures measured data such as a temperature, a power use amount, a water use amount, and a pressure, and stores the sensed, collected, and measured data in the security memory 300. Accordingly, the measured data transmitted from the first core unit 100 may be stored in the security memory 300.

The second core unit 200 performs a function of processing the collected data unlike the first core unit 100 performing the data collection function, and particularly encrypts the measured data stored in the security memory 300 and transmits the encrypted data to an external device.

To this end, the second core unit 200 includes a communication unit 210 communicating with an external interface to transmit and receive data, an encryption unit 220 accessing the security memory to encrypt the measured data stored in the security memory and transferring the encrypted specific data to the communication unit, and an operation unit 230 controlling a data processing process generated through the second core unit.

In particular, the encryption unit 220 according to the present invention withholds a transmission process of the measured data until the measured data collected in the security memory are accumulated and stored by a predetermined number, sets variable data representing a feature of an accumulated and stored data group when it is confirmed that the measured data have been accumulated and stored by the predetermined number, and encrypts the measured data on the basis of the set variable data.

To this end, as illustrated in FIG. 2, the encryption unit 220 extracts a data group to be transmitted by grouping the accumulated and stored collected data into a data group (S10), sets variable data according to a feature of the extracted data group (S20), generates modified data in which the set variable data are connected to the respective collected data and converts the generated modified data into hash values through a hash function (S30), and transmits the hash values to the communication unit 210, thereby allowing the intelligent smart meter to be able to transmit the encrypted measured data to the outside.

In an embodiment, the encryption unit 220 detects measured data corresponding to a reference value received from a manager terminal possessed by a manager managing the smart energy system among a plurality of accumulated and stored measured data when it is confirmed that the measured data have been accumulated and stored by the predetermined number, and generates variable data on the basis of storage points in time of the detected measured data and the number of detected measured data, converts modified data in which the generated variable data and the respective measured data are combined with each other into hash values using a hash function, and transfers the converted hash values to the communication unit.

For example, as illustrated in FIG. 3, the encryption unit 220 extracts a measured value (171 KW) corresponding to a fourth data of a plurality of accumulated and stored measured data when it receives information indicating that the fourth data is a reference value from the manager terminal. Thereafter, the encryption unit 220 may generate messages representing respective storage points in time of measured data representing the extracted 171 KW and sizes of the extracted measured data as variable data, and generate modified data in which the variable data are connected to the respective measured data, for each measured data, as illustrated in FIG. 4. The encryption unit 220 may convert the generated modified data into respective hash values using a hash function. A data processing technology using the hash function is a known technology, and a description for a detailed process of extracting the hash value will thus be omitted.

In this case, the encryption unit 220 according to the present invention generates the variable data on the basis of the reference value received from the manager terminal, and converts the measured data into the hash values on the basis of the generated variable data, such that security of the measured data may be improved.

In particular, the encryption unit 220 newly generates the modified data every time according to a type (feature) of the measured data grouped at a data transmission point in time even though the reference value received from the manager terminal is the same. Therefore, it is almost impossible to find out original information through the hash value, it is almost impossible to falsify or forge the data, and reliability and integrity of the data may thus be ensured.

In another embodiment, the encryption unit 220 calculates the number of measured data representing the same measured value among the plurality of accumulated and stored measured data and sets measured data representing the same measured value most as the variable data, when it is confirmed that the measured data have been accumulated and stored by the predetermined number.

In this case, the encryption unit 220 calculates an average value of the plurality of accumulated and stored measured data and sets the calculated average value as the variable data, converts modified data in which the set variable data and the respective measured data are combined with each other into hash values using a hash function, and transfers the converted hash values to the communication unit, when it is confirmed that all of the plurality of accumulated and stored measured data represent different measured values.

In still another embodiment, the encryption unit 220 calculates the number of measured data representing the same measured value among the plurality of accumulated and stored measured data and sets measured data representing the same measured value most as the variable data, when it is confirmed that the measured data have been accumulated and stored by the predetermined number.

In this case, the encryption unit 220 may calculate an average value of the plurality of accumulated and stored measured data and set the calculated average value as the variable data, convert the variable data into hash values using a hash function, encrypt the measured data, and transmit the encrypted measured data with the hash values as headers to the communication unit, when it is confirmed that all of the plurality of accumulated and stored measured data represent different measured values.

Specifically, referring to FIG. 5 together, the encryption unit 220 according to still another embodiment of the present invention may generate transmission data with the hash value for the variable data as a header file and with the encrypted measured data as message data.

In this case, the variable data is generated by the same process as the variable data generating process according to an embodiment of the present invention described with reference to FIG. 3. That is, the encryption unit 220 may generate the variable data by extracting data generating the hash value among a plurality of data groups on the basis of the received reference value.

Here, any one of data encryption technologies according to the related art (for example, private key/public key encryption technology) may be applied as a technology of encrypting the measured data, and such a data encryption/decryption technology is a well-known technology and a detailed description therefor will thus be omitted.

Therefore, a receiving end may confirm whether or not normal data have been received by inspecting whether or not the hash values are the same as each other, and may obtain information on the measured data (consumed power) by decrypting files other than header files of the received normal data.

The term '~unit' used in the above exemplary embodiments refers to software or a hardware component such as a field programmable gate array (FPGA) or an application specific integrated circuit (ASIC), and the '~ unit' plays certain roles. However, the '~unit' is not limited to the software or the hardware. The '~unit' may be configured to be in an addressable storage medium or may be configured to reproduce one or more processors. Therefore, as an example, the '~unit' includes components such as software components, object-oriented software components, class components and task components, processes, functions, attributes, procedures, subroutines, segments of a program patent code, drivers, firmware, a microcode, a circuit, data, a database, data structures, tables, arrays, and variables.

Components and functions provided within the '~units' may be combined with a smaller number of components and the '~units' or be separated from additional components and the '~units'.

Furthermore, components and the '~units' may be implemented to reproduce one or more central processing units (CPUs) in a device or a security multimedia card.

A data processing technology performed in such an integrated one-chip security module for a smart energy security threat response may be implemented as an application or may be implemented in a form of program instructions that may be performed through various computer components and be recorded in a computer-readable recording medium.

The computer-readable recording medium may include program instructions, data files, data structures, or the like, alone or a combination thereof.

The program instructions recorded in the computer-readable recording medium may be especially designed and constituted for the present invention or be known to those skilled in the field of computer software.

Examples of the computer-readable recording medium may include a magnetic medium such as a hard disk, a floppy disk, or a magnetic tape; an optical medium such as a compact disk read only memory (CD-ROM) or a digital versatile disk (DVD); a magneto-optical medium such as a floptical disk; and a hardware device especially configured to store and execute program instructions, such as a ROM, a random access memory (RAM), or a flash memory.

Examples of the program instructions include a high-level language code capable of being executed by a computer using an interpreter, or the like, as well as a machine language code created by a compiler. The hardware device may be constituted to be operated as one or more software modules to perform processing according to the present invention, and vice versa.

According to an aspect of the present invention described above, a core for collecting data and a core for encrypting and transmitting the data are separately operated, and only the encryption unit accesses a security memory to encrypt the data, such that security of the data may be improved.

In addition, since the variable data is set according to a feature of data to be transmitted, it is impossible to grasp a type of the variable data from the outside, such that it is difficult to falsify or forge the data, and reliability of the data may thus be improved.

Although the embodiments of the present invention have been described hereinabove, those skilled in the art will be able to understand that the present invention may be variously modified and altered can be made without departing from the spirit and scope of the present invention disclosed in the following claims.

What is claimed is:

1. An integrated one-chip security module for a smart energy security threat response included in an intelligent smart meter constituting a smart energy system, comprising:
    a first core unit collecting measured data generated in an operation process of the smart energy system and stores the measured data in a security memory; and
    a second core unit encrypting the measured data stored in the security memory and transmitting the encrypted data to an external device,
    wherein the second core unit includes:
    a communication unit communicating with an external interface to transmit and receive data;
    an encryption unit accessing the security memory to encrypt the measured data stored in the security memory and transferring the encrypted specific data to the communication unit; and
    an operation unit controlling a data processing process generated through the second core unit, and
    wherein the encryption unit is withholding a transmission process of the measured data until the measured data collected in the security memory are accumulated and stored by a predetermined number, setting variable data representing a feature of an accumulated and stored data group when it is confirmed that the measured data have been accumulated and stored by the predetermined number, and encrypting the measured data on the basis of the set variable data.

2. The integrated one-chip security module for a smart energy security threat response of claim 1, wherein the setting of the variable data representing the feature of the accumulated and stored data group
    detects measured data corresponding to a reference value received from a manager terminal possessed by a manager managing the smart energy system among a plurality of accumulated and stored measured data when it is confirmed that the measured data have been accumulated and stored by the predetermined number, and
    generates variable data on the basis of storage points in time of the detected measured data and the number of detected measured data, converts modified data in which the generated variable data and the respective measured data are combined with each other into hash values using a hash function, and transfers the converted hash values to the communication unit.

3. The integrated one-chip security module for a smart energy security threat response of claim UM, wherein the setting of the variable data representing the feature of the accumulated and stored data group
    calculates the number of measured data representing the same measured value among a plurality of accumulated and stored measured data and sets measured data representing the same measured value most as the variable data, when it is confirmed that the measured data have been accumulated and stored by the predetermined number, and
    calculates an average value of the plurality of accumulated and stored measured data and sets the calculated average value as the variable data, converts modified data in which the set variable data and the respective measured data are combined with each other into hash values using a hash function, and transfers the converted hash values to the communication unit, when it is confirmed that all of the plurality of accumulated and stored measured data represent different measured values.

4. The integrated one-chip security module for a smart energy security threat response of claim UM, wherein the setting of the variable data representing the feature of the accumulated and stored data group
    calculates the number of measured data representing the same measured value among a plurality of accumulated and stored measured data and sets measured data representing the same measured value most as the variable data, when it is confirmed that the measured data have been accumulated and stored by the predetermined number, and
    calculates an average value of the plurality of accumulated and stored measured data and sets the calculated average value as the variable data, converts the variable data into hash values using a hash function, encrypts the measured data, and then transmits the encrypted measured data with the converted hash values as headers to the communication unit, when it is confirmed that all of the plurality of accumulated and stored measured data represent different measured values.

* * * * *